US009178391B2

(12) United States Patent
Claramunt Estecha et al.

(10) Patent No.: US 9,178,391 B2
(45) Date of Patent: Nov. 3, 2015

(54) PERMANENT MAGNET MODULES AND ROTORS

(71) Applicant: ALSTOM RENOVABLES ESPAÑA, S.L., Barcelona (ES)

(72) Inventors: Santiago Claramunt Estecha, Barcelona (ES); Adrian Bueno De Santiago, Barcelona (ES)

(73) Assignee: ALSTOM RENEWABLE TECHNOLOGIES, Grenoble (FR)

( * ) Notice: Subject to any disclaimer, the term of this patent is extended or adjusted under 35 U.S.C. 154(b) by 230 days.

(21) Appl. No.: 14/032,142

(22) Filed: Sep. 19, 2013

(65) Prior Publication Data

US 2014/0084720 A1  Mar. 27, 2014

Related U.S. Application Data

(60) Provisional application No. 61/729,984, filed on Nov. 26, 2012.

(30) Foreign Application Priority Data

Sep. 25, 2012  (EP) .................................... 12382372

(51) Int. Cl.
*H02K 21/12* (2006.01)
*H02K 1/27* (2006.01)
(Continued)

(52) U.S. Cl.
CPC ................ *H02K 1/27* (2013.01); *H02K 1/2766* (2013.01); *H02K 1/32* (2013.01); *H02K 7/1838* (2013.01); *H02K 2213/12* (2013.01); *Y02E 10/725* (2013.01)

(58) Field of Classification Search
USPC ............ 310/156.12–156.15, 156.19, 156.26, 310/156.28–156.29
See application file for complete search history.

(56) References Cited

U.S. PATENT DOCUMENTS 6,384,504 B1 * 5/2002 Ehrhart et al. ........... 310/156.55
6,392,324 B1 * 5/2002 Kuwahara ................ 310/156.11
(Continued)

FOREIGN PATENT DOCUMENTS

EP       2 498 376         9/2012
WO    WO 2007/063370      6/2007
(Continued)

OTHER PUBLICATIONS

European Search Report for EP 12382372, mailed Mar. 6, 2013, 4 pgs.

*Primary Examiner* — Thanh Lam
(74) *Attorney, Agent, or Firm* — Squire Patton Boggs (US) LLP (57) ABSTRACT

A permanent magnet rotor comprising a rotor rim and a plurality of permanent magnet modules arranged on the outer or inner circumference of the rotor rim. The permanent magnet modules comprise a base adapted to be fixed to the rotor rim, one or more permanent magnets, and a central magnet support structure. The base and the central magnet support structure comprise a plurality of radial holes. The permanent magnet modules are adapted so that, when bolts are inserted in the radial holes to fix the central magnet support structure to the base, at least a portion of a first and a second surface of each permanent magnet remain substantially in conforming contact with a surface of the base and a surface of the central magnet support structure, respectively.

14 Claims, 8 Drawing Sheets

(51) Int. Cl.
*H02K 1/32* (2006.01)
*H02K 7/18* (2006.01)

(56) References Cited

U.S. PATENT DOCUMENTS

| | | | |
|---|---|---|---|
| 6,433,453 B1* | 8/2002 | Kitayoshi | 310/156.01 |
| 6,703,741 B1* | 3/2004 | Ifrim | 310/156.19 |
| 6,717,324 B2* | 4/2004 | Chen | 310/268 |
| 2003/0085629 A1* | 5/2003 | Van Dine et al. | 310/156.08 |
| 2005/0093391 A1* | 5/2005 | McMullen et al. | 310/156.55 |
| 2006/0028083 A1* | 2/2006 | Costin et al. | 310/156.55 |
| 2006/0220483 A1* | 10/2006 | Jones et al. | 310/156.19 |
| 2009/0015091 A1* | 1/2009 | Yang et al. | 310/156.09 |
| 2009/0302702 A1* | 12/2009 | Pabst et al. | 310/156.12 |

FOREIGN PATENT DOCUMENTS

| | | |
|---|---|---|
| WO | WO 2011/012133 | 2/2011 |
| WO | WO 2011/124232 | 10/2011 |

* cited by examiner

PERMANENT MAGNET MODULES AND ROTORS

This application claims the benefit of European Patent Application No. 12382372.6 filed on Sep. 25, 2012 and U.S. Provisional Patent Application Ser. No. 61/729,984 filed on Nov. 26, 2012, the disclosures of which are hereby incorporated by reference in their entirety for all purposes.

The present invention relates to permanent magnet modules and rotors for electrical machines, and more particularly relates to permanent magnet modules and rotors that are especially suitable for wind turbines.

BACKGROUND ART

Electrical machines, such as motors and generators having a rotor with permanent magnets are known. They are generally deemed to be reliable and require less maintenance than other generator topologies.

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft either directly drives the generator rotor ("directly driven") or through the use of a gearbox. Particularly for offshore wind turbines, direct drive systems employing permanent magnets are usually chosen.

Such a direct drive wind turbine generator may have e.g. a diameter of 6-8 meters and a length of e.g. 2-3 meters. Hundreds of magnets may need to be attached, e.g. by screwing or gluing to the circumference of the rotor. It will be clear that this manufacturing process can be cumbersome.

Furthermore, if one or more of the magnets is damaged and needs to be replaced, the access to these magnets can be complicated (especially with large size generators), such that maintenance can become very expensive.

This size and type of generator however is not limited to offshore applications, and not even to the field of wind turbines only. Generators of considerable dimensions that may suffer from the same problems and/or have the same complications may also be found e.g. in steam turbines and water turbines. Also relatively large permanent magnet motors may have the same or similar problems.

Examples of permanent magnet rotors that aim at dealing with the aforementioned problems may comprise a rotor rim and a plurality of permanent magnet modules arranged on the outer or inner circumference of the rotor rim. The permanent magnet modules may extend generally along an axial direction and may be of substantially constant axial-cross section. The permanent magnet modules may comprise a base adapted to be fixed to the rim of the generator rotor and a central magnet structure. The central magnet structure may comprise one or more permanent magnets, and a central magnet support structure acting as a flux concentrator. The central magnet support structure may comprise a plurality of radial holes. The base may also comprise a plurality of radial holes aligned with the radial holes of the central magnet support structure. Bolts or screws inserted in the radial holes may be used to fix the central magnet structure to the base. Once the permanent magnet module is assembled, a first surface of each magnet should be in contact with the central magnet support structure and a second surface with the base.

However, a problem may arise when such a permanent magnet module is assembled. As the bolts are tightened, the central magnet support structure exerts a non-uniform pressure on the lateral sides or wings of the base. As a result the base of the permanent magnet module may deform and stress concentration points or areas may appear. When the base is deformed, at least one side of the permanent magnets may become detached. Consequently, when the rim rotates, during operation, the permanent magnets may vibrate. Such vibrations may increase the noise levels of the permanent magnet rotor, may accelerate wear of the central magnet structure and may reduce the magnetic flux. Consequently, the effectiveness of the flux concentrator is compromised.

It would be desirable to provide a permanent magnet rotor in which the above drawbacks are at least partially solved.

SUMMARY OF THE INVENTION

In a first aspect, a permanent magnet module is proposed suitable for use in a permanent magnet rotor, the permanent magnet rotor comprising a rotor rim and a plurality of permanent magnet modules arranged on the outer or inner circumference of the rotor rim. The permanent magnet module may extend generally along an axial direction and may be of substantially constant axial-cross section. The permanent magnet module may comprise a base adapted to be fixed to the rim of the generator rotor and a central magnet structure. The central magnet structure may comprise a central magnet support structure and one or more permanent magnets adjoined to the central magnet support structure. The base and the central magnet structure may comprise a plurality of radial holes, wherein each hole of the base may be aligned with each hole of the central magnet structure, respectively. The central magnet structure may be fixed to the base by a plurality of bolts inserted in the radial holes. The permanent magnet module may be adapted so that, upon deformation as a result of the bolts being inserted in the radial holes to fix the central magnet structure to the base, at least a portion of a first and a second surface of each permanent magnet may substantially be in conforming contact with a surface of the base and with a surface of the central magnet support structure, respectively.

In this aspect of the invention, it has been identified that the cause of the problem of stress concentration areas is that the permanent magnets are in non-conforming contact with the base and with the central magnet support structure after the bolts are tightened. The reason is that, while tightening of the bolts, non-uniform pressure may be exerted on certain sections of the base. To mitigate the problem of the creation of stress concentration areas, a permanent magnet module is provided to provide substantially conforming contact between the permanent magnets and the base and/or with the central magnet support structure, even when the base is deformed. Adaptation of the permanent magnet module results in an increase in the number of contact points, on one side between a first surface of the permanent magnet and a surface of the central magnet support structure and, on the other side between a second surface of the permanent magnet and a surface of the base. Such an increase in the number of contact points is measured when comparing an adapted permanent magnet module and a non-adapted permanent magnet module. Although in both cases the base is deformed, an adapted permanent magnet module comprises a permanent magnet having at least a portion of a first and a second surface that may be substantially in conforming contact with a surface of the base and with a surface of the central magnet support structure, respectively, after fixing of the base to the central magnet structure. In contrast, in a non-adapted permanent magnet module, a first and a second surface of the permanent magnet may be in non-conforming contact with a surface of the base and with a surface of the central magnet support structure, respectively, after fixing of the base to the central magnet structure.

A conforming contact may be defined as one in which two bodies may touch at multiple points (i.e., they just "fit together") so that, when pressed together, the stress points are distributed along the multiple points of contact. Furthermore, movement of one body results in movement of the other body in unison. That is, movement of one body does not cause vibrations to the other body. In contrast, a non-conforming contact may be defined as one in which the shapes of the bodies are dissimilar enough that they only touch at a point, or possibly along a line of their surfaces. As a consequence, when pressed together, the contact point (or line) may become a stress point (or line). Furthermore, when one of the bodies moves the other body may vibrate within the non-contacting space that is generated due to the non-conforming contact.

Axial cross-section may be defined as the cross-section with a plane that is perpendicular to the rotational axis of the rotor. An axial direction may be defined as a direction coinciding with the rotational axis of the rotor or parallel thereto.

In some embodiments of the permanent magnet module, the central magnet support structure may be shaped substantially as an inverted triangle having two lateral sides facing the permanent magnets and a top side facing outwardly. The base may comprise two side wings shaped as orthogonal triangles having their hypotenuses facing the permanent magnets.

In some embodiments of the permanent magnet rotor, the central magnet support structure may be provided with lateral sides sized to account for an extended space generated between the two wings of the base when the base is in a deformed state due to the tightening of the bolts so that, after the bolts have been tightened, at least a portion of a first and a second surface of the permanent magnets may substantially be in conforming contact with a surface of the central magnet support structure and with a surface of the base, respectively.

According to these embodiments, the deformation of the base due to fixing of the base to the central magnet structure is taken into account when calculating the size of the central magnet support structure. Therefore, the area that the central magnet support structure shall cover may be estimated not when the bolts are loose, but under the tension of the bolts. As a result the area that the central magnet support structure shall eventually cover after fixing may be different than what would be measured based on the dimensions of the permanent magnet module parts in a loose state. Consequently, the central magnet support structure is manufactured with dimensions corresponding to this different area. Thus, the permanent magnets substantially fit in a conforming manner between the base and the central magnet support structure.

In other embodiments of the permanent magnet rotor, the central magnet support structure may include at least a groove to provide flexibility to the central magnet support structure when the bolts are tightened.

According to these embodiments, when the bolt is tightened during fixing of the base to the central magnet structure, deformation of the base is followed by a corresponding deformation of an area or a part of the central magnet support structure. Thus, at least a part of the central magnet support structure and a part of the base remain substantially parallel and at least a portion of a first and a second surface of each permanent magnet may substantially be in conforming contact with a surface of the base and with a surface of the central magnet support structure, respectively.

In some of the embodiments of the permanent magnet rotor, one or more grooves may be formed at a lateral side of the central magnet support structure that is in contact with one of the permanent magnets. One or more elastic elements are incorporated in the one or more grooves so that, when the bolts are tightened, the elastic elements of the central magnet support structure are deformed. The elastic elements may be placed at a position where no contact would be expected after tightening of the bolt. Therefore, the elastic elements may provide extra contact points between the magnets and the central magnet support structure. As a result, at least a portion of a first and a second surface of each permanent magnet may substantially be in conforming contact with a surface of the base and with a surface of the central magnet support structure, respectively.

In some embodiments of the permanent magnet rotor, the permanent magnet modules may further comprise an axial cooling channel extending substantially along the length of the modules. The central magnet support structure may further comprise one or more axial holes. A groove or slot may extend from the axial cooling channel until one of the axial holes of the central magnet support structure.

According to these embodiments deformation of the area of the central magnet support structure around the slot may provide the necessary deformation to the central magnet support structure so that at least a part of the central magnet support structure and a part of the base may substantially be parallel. As a result, at least a portion of a first and a second surface of each permanent magnet may substantially be in conforming contact with a surface of the base and with a surface of the central magnet support structure, respectively.

In some embodiments of the permanent magnet rotor, the central magnet structure may further comprise a plurality of elastic elements placed between the central magnet support structure and the permanent magnets or between the base and the permanent magnets. These elastic elements may provide extra points of contact between the central magnet support structure and the permanent magnets or between the base and the permanent magnets. As a result, at least a portion of a first and a second surface of each permanent magnet may substantially be in conforming contact with a surface of the base and with a surface of the central magnet support structure, respectively.

In another aspect of the invention a permanent magnet rotor may comprise a rotor rim and a plurality of permanent magnet modules according to the embodiments, wherein all the modules are substantially identical.

In yet another aspect of the invention, a wind turbine may comprise a generator having a generator rotor according to any of the embodiments.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS

Figure 1:
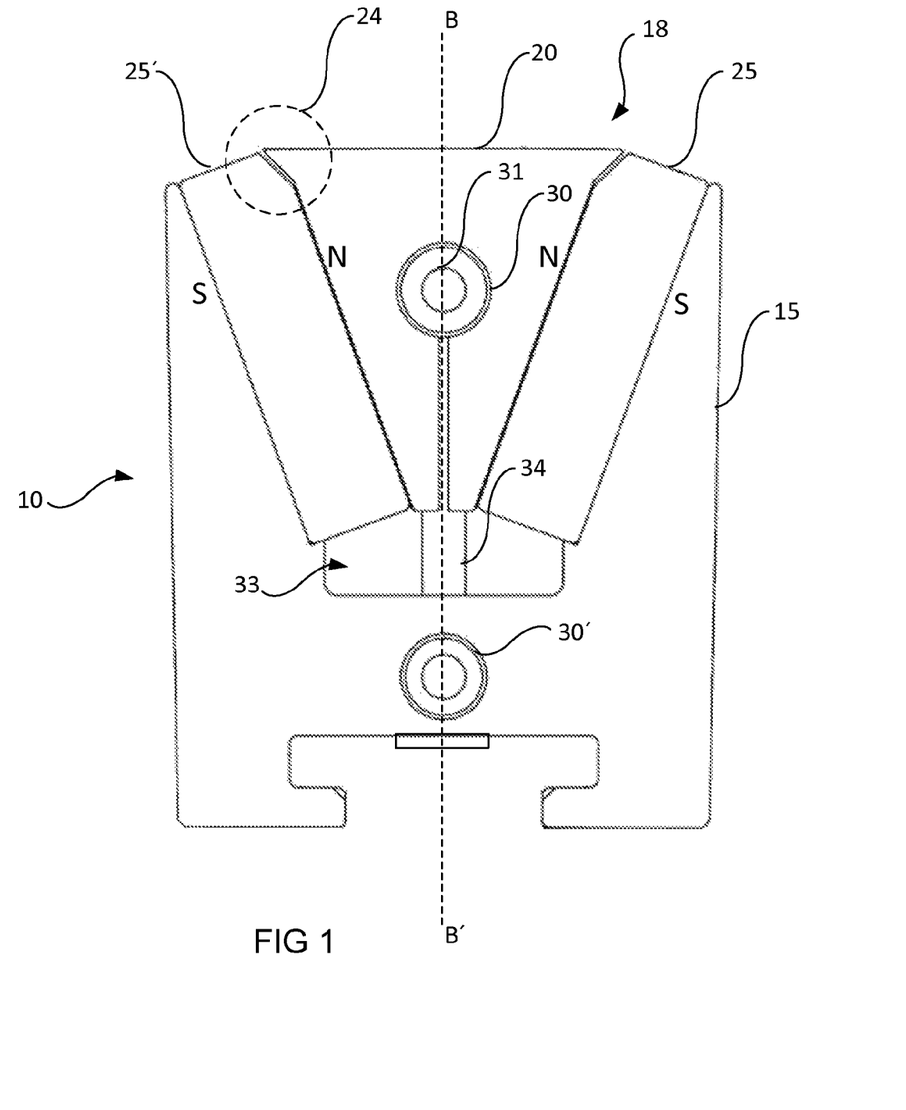
FIG. 1 schematically illustrates a permanent magnet module in accordance with an embodiment of the present invention.

FIG. 1 schematically illustrates a permanent magnet module in accordance with an embodiment of the present invention. Permanent magnet module 10 may comprise base 15 and central magnet structure 18 secured together with bolt 34. Central magnet structure 18 may comprise central magnet support structure 20 and a plurality of permanent magnets 25. Central magnet support structure may include axial hole 30.

Permanent magnet module 10 may comprise at least a first permanent magnet 25 and a second permanent magnet 25' and a central cooling channel 33 located at the foot of the first and second permanent magnets.

The permanent magnets may be of generally rectangular cross-section and may be inclined towards a central radial plane (line B-B) of the permanent magnet module.

Permanent magnet module 10 may comprise a central magnet support structure 20 which acts as a flux concentrator with a cross-section that is substantially close to an inverted triangle. At the top two vertices of the triangle, lateral hooks 24 may be incorporated in order to mechanically lock the permanent magnets in between the central magnet support structure 20 and the base 15 of the permanent magnet module.

Central magnet support structure 20 may comprise an axial hole 30 in which a rod 31 may be inserted. A plurality of radial holes, at different axial positions, may be provided in the central magnet support structure. Rod 31 may comprise a number of transverse through-holes (not shown), such that when the rod is inserted, the transverse through-holes are lined up with the radial holes of the central magnet support structure. Base 15 also includes a number of radial holes lined up with the radial holes of central magnet support structure. Bolts 34 that may be inserted in these radial holes may extend into and beyond the transverse holes of rod 31, into an upper portion of the central magnet support structure 20. The permanent magnets may thus be clamped between base 15 and central magnet support structure 20. A secure way of fixing the magnets in the module may thus be established.

Figure 1A:
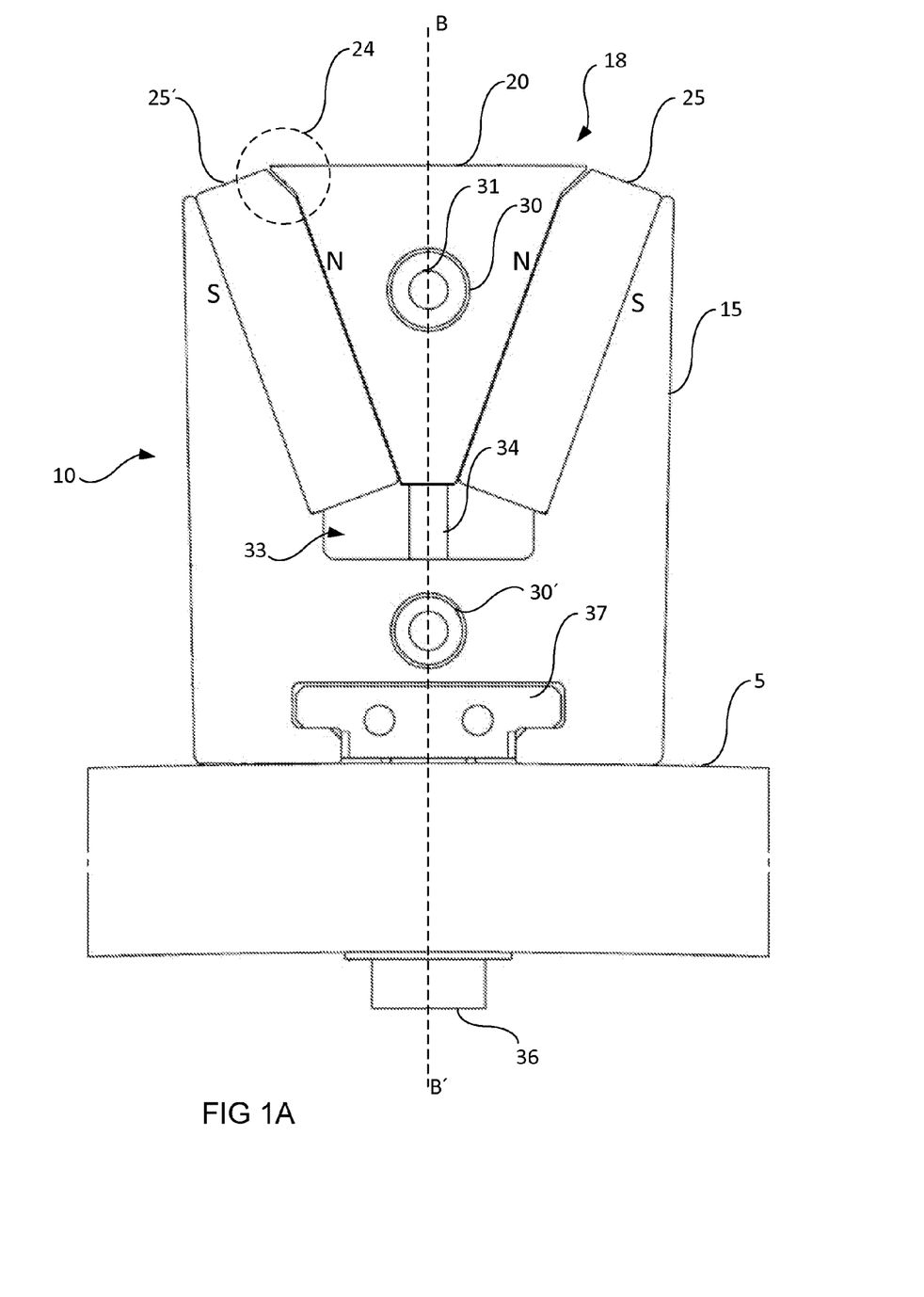
FIG. 1A illustrates a detail of a permanent magnet rotor in accordance with an embodiment of the present invention.

FIG. 1A schematically illustrates a detail of a permanent magnet rotor in accordance with an embodiment of the present invention. The permanent magnet rotor comprises rotor rim 5 and a plurality of permanent magnet modules 10 fixedly secured together with a plurality of bolts 36, respectively. Permanent magnet module 10 may include base 15, central magnet support structure 20 and a plurality of permanent magnets 25.

Figure 1B:
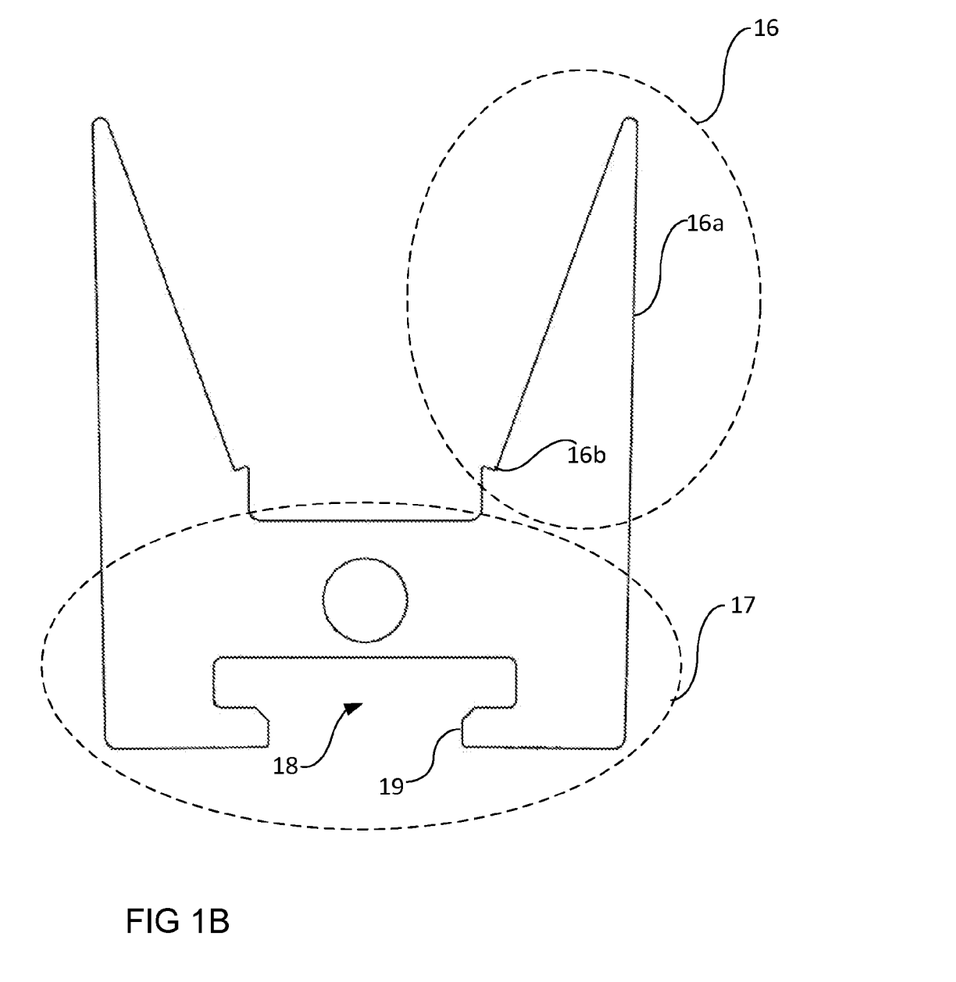
FIG. 1B illustrates a base of a permanent magnet module.

FIG. 1B schematically illustrates base 15 of permanent magnet module 10 of FIG. 1. Base 15 may comprise, as shown, side wings 16 and bottom part 17. A part 16a of side wing 16 may be formed as an orthogonal triangle having a hypotenuse facing inwards. Side wings 16 may further include protrusions 16b on where the permanent magnets may sit. Bottom part 17 may be substantially rectangular and may include groove 18 and legs 19. Groove 18 and legs 19, as shown in FIG. 1A, are used to support anchor 37. Anchor 37 has a T-shape configuration that is substantially complementary to the shape of groove 18 with legs 19. Anchor 37 may press the legs 19 of bottom part 17 of base 15 against the rotor rim and fix the permanent magnet module in place.

To assemble the rotor, anchors 37 may be loosely attached at the circumference of the rotor rim. Then, permanent magnet modules 10 may be inserted and slid along the anchors. Then, to fix the permanent magnet modules in place, bolts 36 of the anchors may be tightened, so that the anchors press a portion of the base against the circumference of the rotor rim.

In the embodiment of FIG. 1 the pairs of (rows of) permanent magnets of the modules are arranged in a "V"-shape resting between the hypotenuses of side wings 16 and the lateral sides of central magnet support structure 20. This disposition of magnets in combination with the integrated cooling channels may reduce leakage of magnetic flux.

Inclination of the magnets with respect to the corresponding local radial plane (radial plane passing through the center of the magnet) may vary. The angle of inclination with respect to the radial plane may be in the range of 0-90°, more particularly in the range of 10°-50°, in particularly between 10° and 40°.

During assembly and more particularly during fixing of central magnet structure 18 to base 15, base 15 may be deformed. More particularly, when bolts 34 are tightened, non-uniform pressure is applied on wings 16 of base 15. As a result, base 15 may be deformed, side wings 16 of base 15 may deflect outwardly, and the area between wings 16 is extended. Consequently, after fixing of central magnet support is completed, a gap may be created between permanent magnets 25 and base 15 and/or between the central magnet support structure and the permanent magnets.

According to the embodiment of the permanent magnet module of FIG. 1, the size and/or shape of central magnet support structure 20 may be adapted so that the central magnet support structure and the magnets substantially fit in a conforming manner, that is the are provided with a plurality of contact points that do not allow relative movement of the permanent magnets and, consequently, vibrations, in the (extended) space provided between the wings 16 of base 15 when bolts 34 are tightened. To account for the deformation of base 15 during assembly of the permanent magnet module, the dimensions of central magnet support structure 20 may be purposefully manufactured slightly larger than they would be if measurement was based only on the dimensions of the available space between wings 16 in an unassembled state. As a result, the area that central magnet support structure 20 shall eventually span after assembly may be greater than what appears in tranquility.

Figure 2:
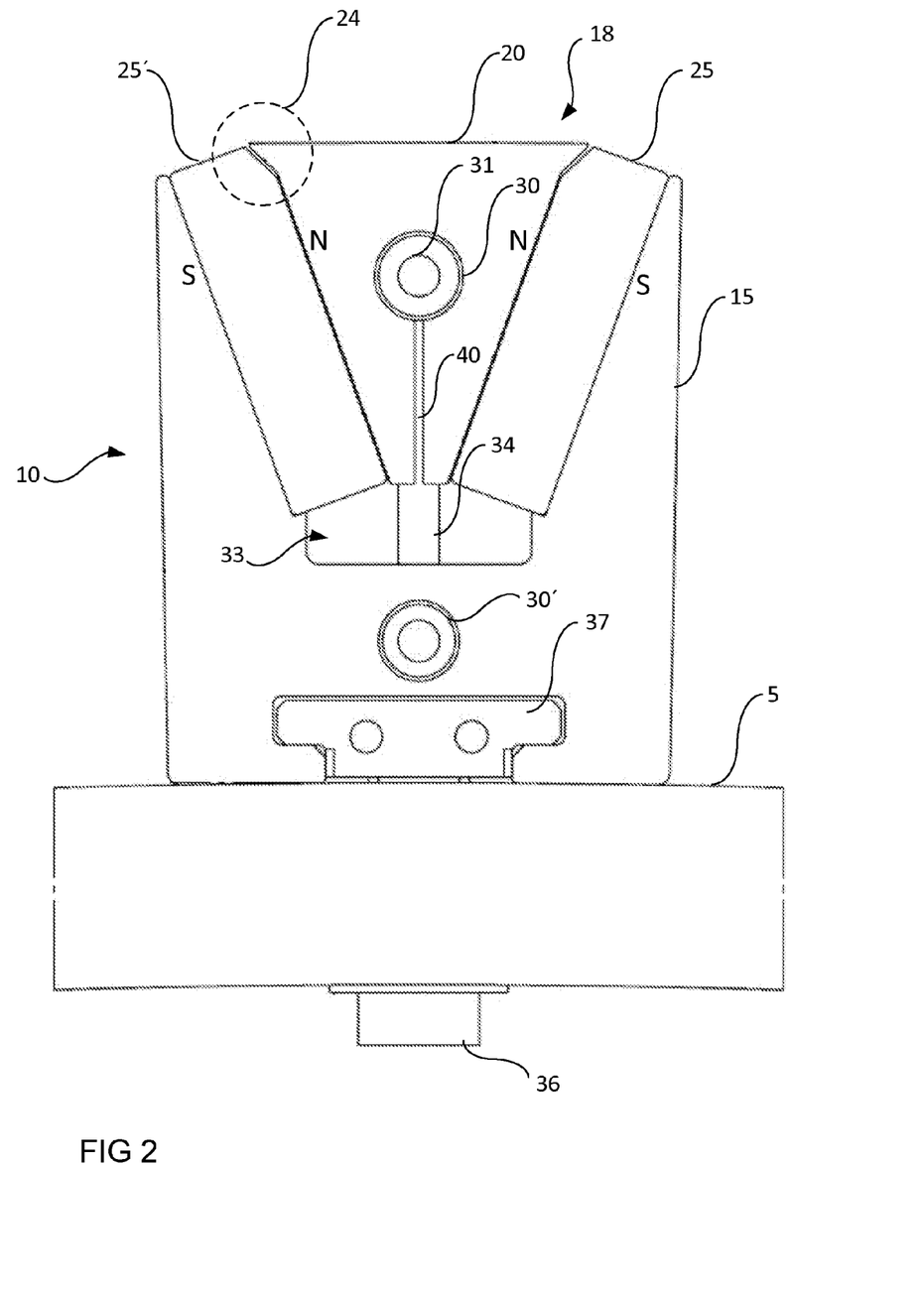
FIG. 2 schematically illustrates a detail of a permanent magnet rotor in accordance with another embodiment of the present invention.

FIG. 2 schematically illustrates a detail of a permanent magnet rotor in accordance with another embodiment of the present invention. Central magnet support structure 20 may include at least one groove (or slot) 40 extending from air channel 33 up to axial hole 30. During fixing of base 15 to central magnet structure 18, non-uniform pressure is exerted between central magnet structure 18 and wings 16 of base 15. Slot 40 allows central magnet support structure to deform and absorb at least part of the induced stress. As a result, permanent magnets 25, 25' may remain substantially in conforming contact along at least a portion of their entire length with both the inner side of the side wings and with the lateral sides of the central magnet support structure.

In another implementation (not shown), the slot may extend from axial hole 30 up to the top side of the central magnet support structure. In yet another implementation, two slots in a V-configuration extend from axial hole 30 up to the top side of the central magnet support structure. One skilled in the art may appreciate that the position and number of slots may be determined once the deformation pattern of the base of the permanent magnet module due to fixing of central magnet structure to base is known.

Figure 2A:
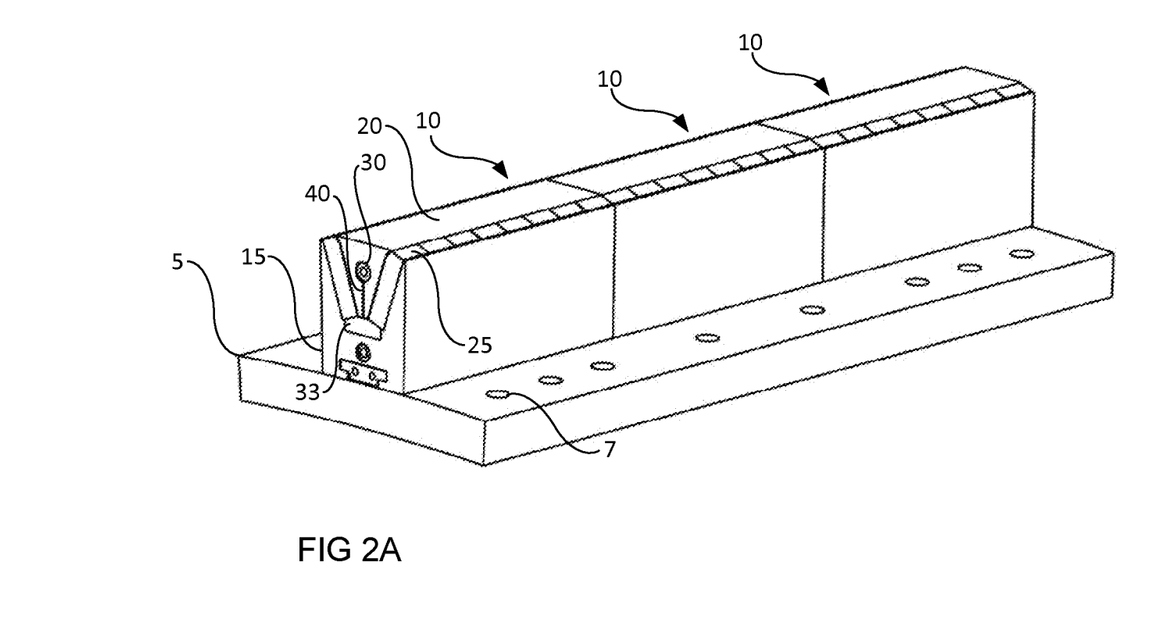
FIG. 2A is a perspective view of a detail of a permanent magnet rotor in accordance with the embodiment of FIG. 2.

FIG. 2B schematically illustrates a detail of a permanent magnet rotor in accordance with a further embodiment of the present invention. A plurality of permanent magnet modules 10 are fixed on rotor rim 5. Each permanent magnet module 10 comprises a base 15, a central magnet support structure 20 with a slot and a plurality of magnets 25 arranged in a V-configuration between the base and the central magnet support structure. Each central magnet support structure comprises an axial hole 30 and a slot 40 between an air channel 33 and the axial hole. Rotor rim 5 includes a plurality of radial holes 7 for fixing permanent magnet modules to the rotor rim with bolts.

The permanent magnet modules may be of substantially constant cross-section and may comprise a stack of metal sheets.

Figure 3:
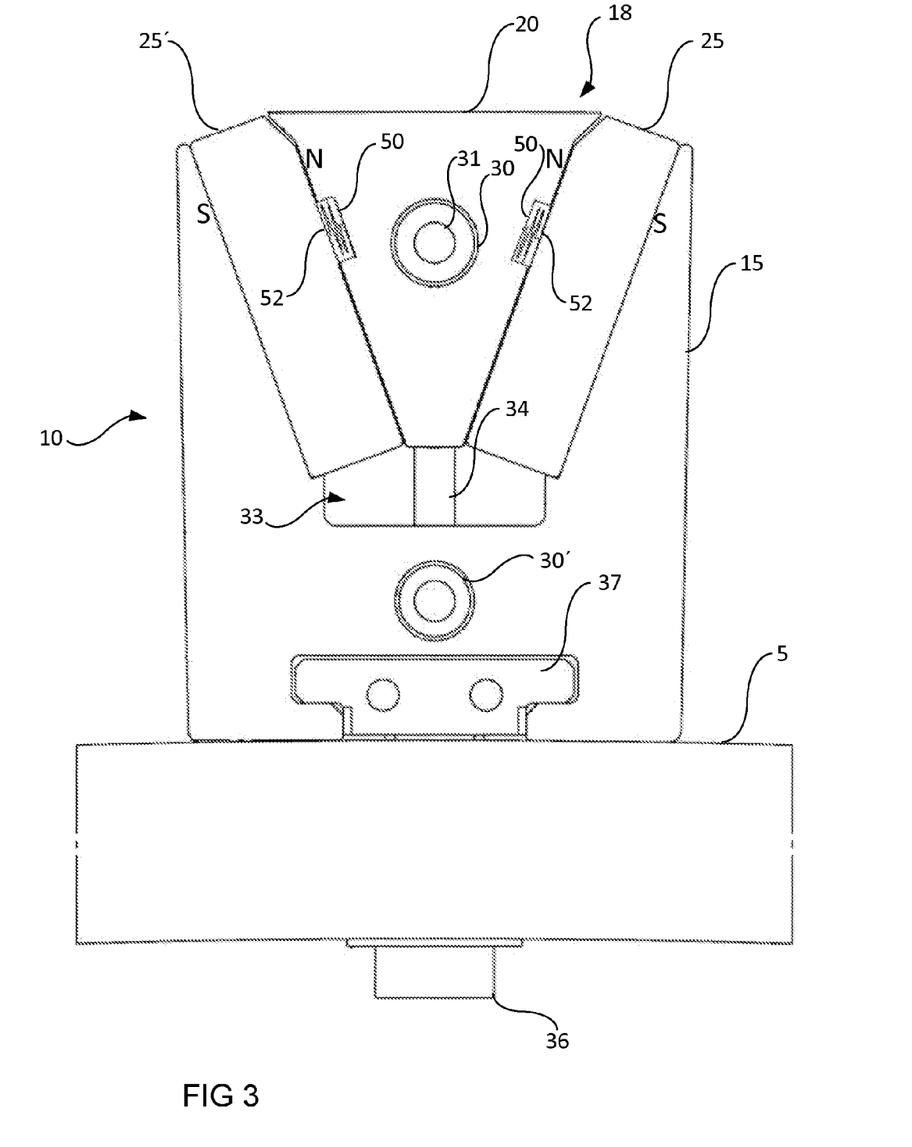
FIG. 3 schematically illustrates a detail of a permanent magnet rotor in accordance with another embodiment of the present invention.

FIG. 3 schematically illustrates a detail of a permanent magnet rotor in accordance with a further embodiment of the present invention. Central magnet support structure 20 may include a plurality of grooves 50. At least one of grooves 50 may be formed at each lateral side of central magnet support structure 20 that is in contact with a permanent magnet, respectively. Each groove 50 may include elastic element 52. Elastic elements 52 may be springs or masses of any resilient material. One skilled in the art may appreciate that any item with resilient properties may be used. Elastic elements 52 may slightly protrude from groove 50 when bolt 34 is not fixed. During fixing of central magnet structure to base, side wings 16 may deform and, as a consequence, elastic elements 52 deform as well. As a result, conforming contact between portions of the sides of permanent magnets 25, 25' and the sides of central magnet support structure 20 and/or of the wings may be maintained. Elastic elements 52 provide extra contact points between permanent magnets 25, 25' and central magnet support structure 20. Furthermore, the elastic elements push the permanent magnets towards the base and force contact of the permanent magnets with the wings of the base in areas where, otherwise, there would be no contact as a result of the deformation of the base.

Figure 4:
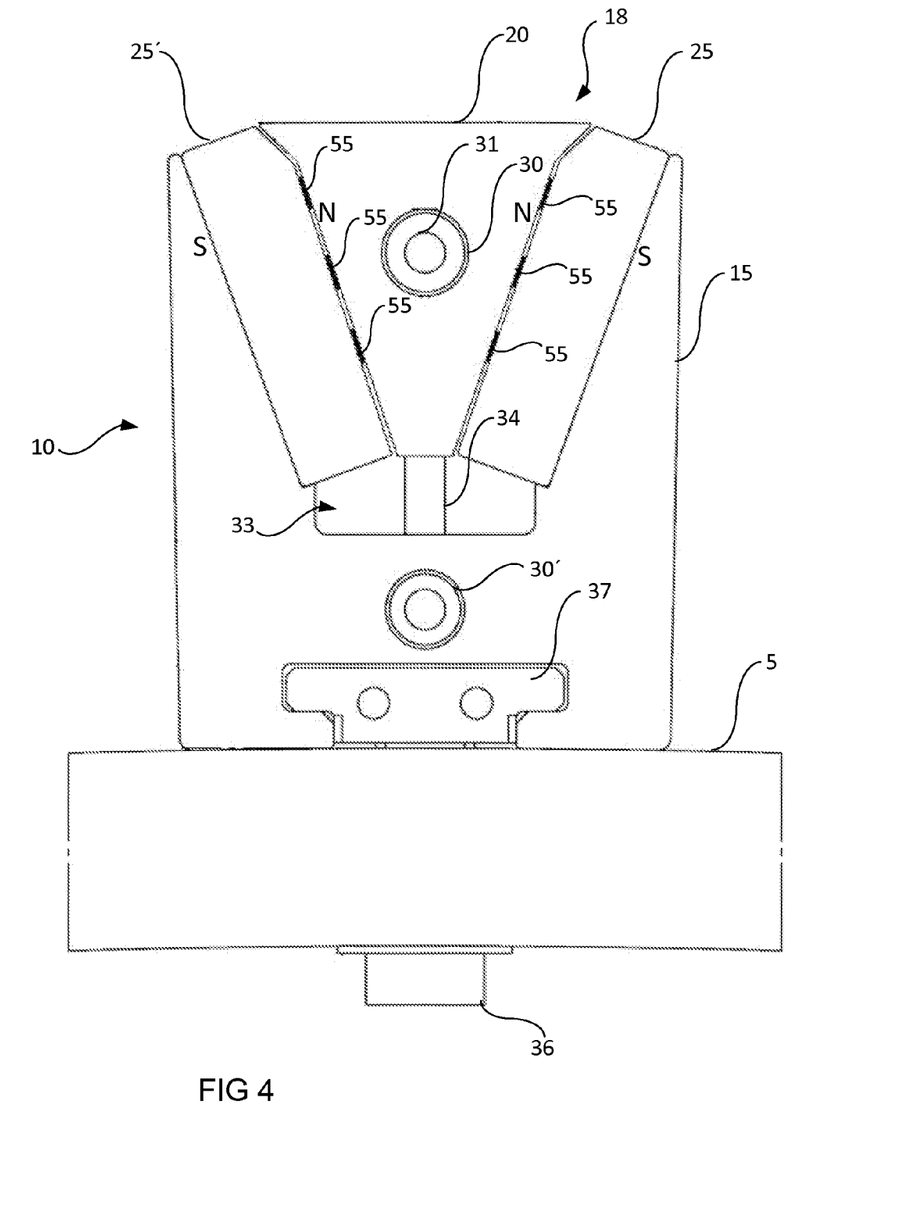
FIG. 4 schematically illustrates a detail of a permanent magnet rotor in accordance with another embodiment of the present invention.
Figure 5:
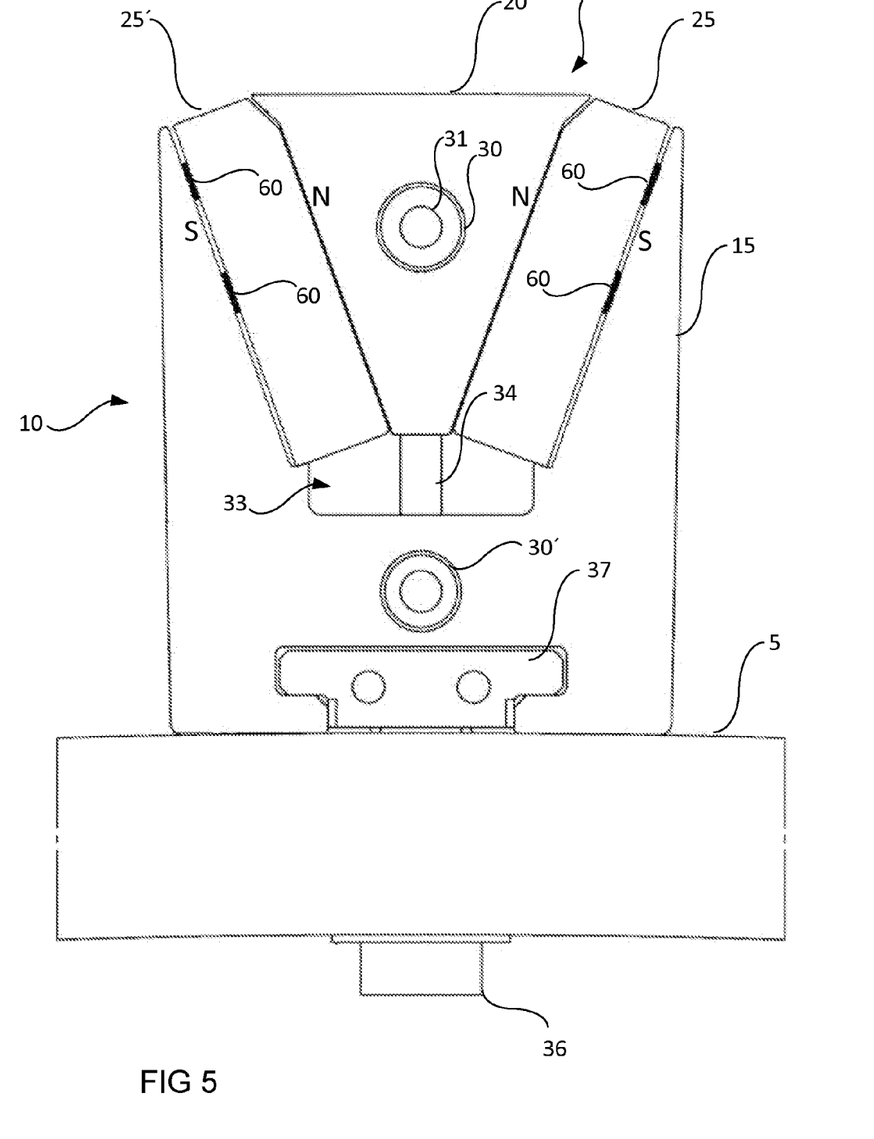
FIG. 5 schematically illustrates a detail of a permanent magnet rotor in accordance with another embodiment of the present invention.

FIGS. 4 and 5 schematically illustrate a detail of a permanent magnet rotor in accordance with further embodiments of the present invention. Elastic elements 55 may be provided between central magnet support structure 20 and permanent magnets 25, 25' as shown in FIG. 4. Accordingly, central magnet structure 18 may comprise elastic elements 60 between permanent magnets 25, 25' and side wings 16 as shown in FIG. 5. Elastic elements 55 may be arranged along the lateral sides of central magnet support structure. Elastic elements 60 may be arranged along the sides of the permanent magnets that face side wings 16 of base 15. Elastic elements 55, 60 may be springs or masses of any resilient material. During fixing of central magnet structure to base, side wings 16 deform. Elastic elements 55, 60 deform as well so that conforming contact between portions of the sides of permanent magnets 25, 25' and the sides of central magnet support structure 20 and/or of the side wings may be maintained. Elastic elements 55, 60 provide extra contact points between permanent magnets 25, 25' and central magnet support structure 20 or between permanent magnets 25, 25' and base 15, respectively. Furthermore, the elastic elements push the permanent magnets towards the central magnet support structure or towards the base and force contact of the permanent magnets with lateral sides of the central magnet support structure or with the wings of the base in areas where, otherwise, no contact would be possible as a result of the deformation of the base.

It should be noted that in working conditions the bolt that fixes the central magnet structure to the base may loosen up. In the embodiments where adaptation of the central magnet structure provides flexibility to the central magnet structure, said flexibility allows the central magnet structure to adapt to this loose condition and, as a result, the permanent magnets maintain contact with the base and with the central magnet support structure.

In all embodiments, the axial rows of magnets may be a single magnet, or a plurality of magnets axially positioned behind each other.

The North and South of the permanent magnets may be as indicated in FIG. 1. The magnets may have a circumferential orientation (also sometimes referred to as "transversal" or "tangential" orientation), i.e. the North and South of each of the magnets are arranged in the rotor next to each other in a circumferential (or "tangential") direction.

The permanent magnets may be securely fixed to central magnet support structure using suitable adhesive, such as glue. At both the front and the rear end, the magnets may be sealed from the outside using e.g. end plates and/or epoxy resin.

The bottom part of the base may be adapted to fit on the inner or outer circumference of the rotor rim. The bottom part of the base may thus be slightly curved.

Base 15 and central magnet support structure 20 may e.g. be made from steel or another magnetically conducting material. The permanent magnets may be made e.g. from AlNiCo steel (Aluminium-Nickel-Cobalt), rare earth magnetic materials such as neodymium (NdFeB), or samarium-cobalt, but may also be made from e.g. ceramic materials. To facilitate assembly, the permanent magnets may be magnetized after assembly of the permanent magnet modules.

T-shaped anchors 37 may be used to attach the modules to the outer circumference of rotor rim 5.

The permanent magnet modules as illustrated herein may have a length that substantially corresponds to the axial length of the electrical machine, e.g. a generator or motor; each permanent magnet module thus spans substantially the entire length of the electrical machine. In some embodiments, the length of a module may be substantially half of the axial length of the electrical machine; two permanent magnet modules span the length of the electrical machine. In these cases, one module may be inserted from the front and one module may be inserted from the rear. Similarly, in some embodiments, the anchors may span the length of the electrical machine. In other embodiments, the anchors may be divided in various segments that together span the length of the electrical machine.

In most of the embodiments illustrated herein, T-shaped anchors were used to securely fix the base of the modules to the rotor rim. In other embodiments, other anchors may be used that have a different shape that is substantially complementary to the grooves formed at the base.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A permanent magnet module for a permanent magnet rotor, the permanent magnet rotor comprising a rotor rim and a plurality of permanent magnet modules arranged on the outer or inner circumference of the rotor rim, the permanent magnet module extending generally along an axial direction and being of substantially constant axial-cross section, the permanent magnet module comprising:

a base adapted to be fixed to the rotor rim and a central magnet structure, the central magnet structure comprising a central magnet support structure and one or more permanent magnets adjoined to the central magnet support structure, wherein the base and the central magnet structure comprise a plurality of radial holes, each hole of the base aligned with each hole of the central magnet structure, respectively, and wherein the central magnet structure is fixed to the base by a plurality of bolts inserted in the radial holes, wherein the central magnet structure is adapted so that, upon deformation as a result of the bolts being inserted in the radial holes to fix the central magnet structure to the base, at least a portion of a first and a second surface of each permanent magnet are substantially in conforming contact with a surface of the base and with a surface of the central magnet support structure, respectively.

2. The permanent magnet module according to claim 1, wherein the central magnet support structure is shaped substantially as an inverted triangle having two lateral sides each facing a permanent magnet and a top side facing outwardly and wherein the base comprises two side wings shaped as orthogonal triangles each having a hypotenuse facing a permanent magnet.

3. The permanent magnet module according to claim 2, wherein the central magnet support structure is provided with lateral sides sized to account for an extended space generated between the two side wings of the base when the base is in a deformed state due to the tightening of the bolts so that, after the bolts have been tightened, at least a portion of a first and a second surface of the permanent magnets is substantially in conforming contact with a surface of the base and with a surface of the central magnet support structure, respectively.

4. The permanent magnet module according to claim 2, wherein the central magnet support structure further comprises at least a groove to provide flexibility to the central magnet support structure so that, when the bolts are tightened, the central magnet support structure is deformed and, as a result, at least a portion of a first and a second surface of each permanent magnet are substantially in conforming contact with a surface of the base and with a surface of the central magnet support structure, respectively.

5. The permanent magnet module according to claim 2, further comprising at least one groove at a lateral side of the central magnet support structure that is in contact with one of the permanent magnets and wherein an elastic element is incorporated in the at least one groove so that, when the bolts are tightened, the elastic element of the central magnet support structure is deformed and, as a result, at least a portion of a first and a second surface of each permanent magnet are substantially in conforming contact with a surface of the base and with a surface of the central magnet support structure, respectively.

6. The permanent magnet module according to claim 5, wherein a plurality of grooves are formed at each lateral side of the central magnet support structure that is in contact with one of the permanent magnets and wherein an elastic element is incorporated in each groove.

7. The permanent magnet module according to claim 4, further comprising an axial cooling channel extending substantially along the length of the module, and wherein the central magnet support structure further comprises at least one axial hole, wherein the at least one groove extends from the axial cooling channel until the at least one axial hole of the central magnet support structure.

8. The permanent magnet module according to claim 4, wherein the central magnet support structure further comprises at least one axial hole, wherein the groove extends from the at least one axial hole of the central magnet support structure until the top side of the central magnet support structure.

9. The permanent magnet module according to claim 2, the central magnet structure further comprising a plurality of elastic elements placed between the central magnet support structure and the permanent magnets, so that, when the bolts are tightened, the elastic elements are deformed and, as a result, at least a portion of a first and a second surface of each permanent magnet are substantially in conforming contact with a surface of the base and with a surface of the central magnet support structure, respectively.

10. The permanent magnet module according to claim 2, the central magnet structure further comprising a plurality of elastic elements placed between the permanent magnets and the base so that, when the bolts are tightened, the elastic elements are deformed and, as a result, at least a portion of a first and a second surface of each permanent magnet are substantially in conforming contact with a surface of the base and a surface of the central magnet support structure, respectively.

11. A permanent magnet module according to claim 1, further comprising a first and a second axial row of permanent magnets.

12. A permanent magnet module according to claim 1, wherein each of the permanent magnets has a circumferential magnetic orientation and is substantially rectangular in axial cross-section and wherein each of the permanent magnets is inclined with respect to a radial plane of the permanent magnet module.

13. A permanent magnet rotor comprising a rotor rim and a plurality of permanent magnet modules, according to claim 1, wherein all the modules are substantially identical.

14. A wind turbine comprising a generator having a permanent magnet rotor according to claim 13.

* * * * *